US010768953B2

(12) United States Patent
Dobson et al.

(10) Patent No.: US 10,768,953 B2
(45) Date of Patent: Sep. 8, 2020

(54) COMPUTING SYSTEM PROVIDING SUGGESTED ACTIONS WITHIN A SHARED APPLICATION PLATFORM AND RELATED METHODS

(71) Applicant: Citrix Systems, Inc., Fort Lauderdale, FL (US)

(72) Inventors: Robert Dobson, Histon (GB); Robert Breker, Hitchin (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 109 days.

(21) Appl. No.: 16/056,868

(22) Filed: Aug. 7, 2018

(65) Prior Publication Data
US 2020/0050467 A1    Feb. 13, 2020

(51) Int. Cl.
| | | |
|---|---|---|
| *H04L 29/06* | (2006.01) | |
| *G06F 9/451* | (2018.01) | |
| *G06K 9/00* | (2006.01) | |
| *G06F 3/147* | (2006.01) | |
| *G06F 16/2457* | (2019.01) | |

(Continued)

(52) U.S. Cl.
CPC ......... *G06F 9/452* (2018.02); *G06K 9/00469* (2013.01); *H04L 67/42* (2013.01); *G06F 3/147* (2013.01); *G06F 16/24578* (2019.01); *G06F 16/313* (2019.01); *G06K 2209/01* (2013.01); *H04L 51/02* (2013.01); *H04L 51/046* (2013.01); *H04L 51/16* (2013.01)

(58) Field of Classification Search
CPC ......... H04L 51/16; H04L 51/02; H04L 67/42; H04L 51/046; G06Q 30/0269; G06Q 50/01; G06Q 50/167; G06F 9/452; G06F 3/147; G06F 16/24578; G06F 16/313; G06K 9/00469; G06K 2209/01
See application file for complete search history.

(56) References Cited

U.S. PATENT DOCUMENTS 9,176,744 B2   11/2015   Lee
9,538,345 B2   1/2017   Sah et al.
(Continued)

OTHER PUBLICATIONS

Ron McFadyen "Designing Databases With Concept Maps" https://pdfs.semanticscholar.org/db1b/f5924d746bb141f8399ff87cf29451ae41b1.pdf. Concept Mapping: Connecting Educators, Proc. of the Third. Int. Conference on Concept Mapping, Tallinn, Estonia & Helsinki, Finland 2008. pp. 4.
(Continued)

*Primary Examiner* — Jungwon Chang
(74) *Attorney, Agent, or Firm* — Allen, Dyer, Doppelt + Gilchrist, PA

(57) ABSTRACT

A computing system may include at least one client computing device and a display associated therewith, and a server configured to provide access to a plurality of shared applications by the at least one client computing device, and extract text displayed by the shared applications on the display while the shared applications are being used by the at least one client computing device. The server may also be configured to generate a concept map associating the extracted text with actions initiated by the at least one computing device after displaying respective text on the display, and determine a suggested action to perform based upon text subsequently displayed on the display and the concept map.

16 Claims, 9 Drawing Sheets

(51) Int. Cl.
  *H04L 12/58*    (2006.01)
  *G06F 16/31*    (2019.01)

(56) References Cited

U.S. PATENT DOCUMENTS

| | | | | |
|---|---|---|---|---|
| 2011/0307562 | A1* | 12/2011 | Chakra | G06Q 10/10 |
| | | | | 709/206 |
| 2017/0187654 | A1* | 6/2017 | Lee | H04L 51/16 |
| 2017/0295118 | A1* | 10/2017 | Kirk | H04L 51/02 |
| 2018/0075147 | A1* | 3/2018 | Bagheri | G06Q 30/0269 |
| 2018/0189857 | A1* | 7/2018 | Wu | G06Q 50/01 |
| 2018/0300309 | A1* | 10/2018 | Denoue | G06F 17/2229 |
| 2018/0374171 | A1* | 12/2018 | Aizen | G06Q 50/167 |

OTHER PUBLICATIONS

Marlon Davids "Citrix XenApp vs XenDesktop: Key Differences" https://www.umbeehosting.net/blog/citrix-xenapp-vs-xendesktop. pp. 4, Jul. 2016.

* cited by examiner

COMPUTING SYSTEM PROVIDING SUGGESTED ACTIONS WITHIN A SHARED APPLICATION PLATFORM AND RELATED METHODS

BACKGROUND

Traditionally, personal computers include combinations of operating systems, applications, and user settings which are each managed individually by owners or administrators on an ongoing basis. However, many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server(s) may include one or more hypervisors (virtual machine managers) to create and maintain multiple virtual machines, software to manage the hypervisor(s), a connection broker, and software to provision and manage the virtual desktops. In some embodiments, a VDI server(s) may provide access to shared server-based hosted applications, as well as Web/Software-as-a-Service (SaaS) applications.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

SUMMARY

A computing system may include at least one client computing device and a display associated therewith, and a server configured to provide access to a plurality of shared applications by the at least one client computing device, and extract text displayed by the shared applications on the display while the shared applications are being used by the at least one client computing device. The server may also be configured to generate a concept map associating the extracted text with actions initiated by the at least one computing device after displaying respective text on the display, and determine a suggested action to perform based upon text subsequently displayed on the display and the concept map.

In one example implementation, the at least one client computing device may comprise a plurality of client computing devices each with a respective display, and the server may be configured to extract text displayed by the shared applications across the plurality of computing devices. The server may also be configured to generate an overlay on the display including the suggested action, for example.

In accordance with another example implementation, the server may be further configured to increase a weighting associated with the suggested action in the concept map based upon initiation of the suggested action by the at least one client computing device. Furthermore, in an example implementation at least one of the shared applications may comprise a Web application, and the server may extract text displayed by the Web application via a Web browser plugin. In accordance with another example, the server may be configured to perform optical character recognition (OCR) to extract text displayed by at least one of the shared applications on the display. By way of example, the actions may include one or more of opening a service ticket and opening a calendar application, etc.

A related method may include using a server to provide access to a plurality of shared applications by at least one client computing device having a display associated therewith. The method may further include extracting text displayed by the shared applications on the display while the shared applications are being used by the at least one client computing device, generating a concept map at the server associating the extracted text with actions initiated by the at least one computing device after displaying respective text on the display, and generating an overlay on the display including a suggested action to perform based upon text subsequently displayed on the display and the concept map.

A related non-transitory computer-readable medium may have computer-executable instructions for causing a virtualization server to perform steps including providing access to a plurality of shared applications by at least one client computing device having a display associated therewith, and extracting text displayed by the shared applications on the display while the shared applications are being used by the at least one client computing device. The steps may further include generating a concept map associating the extracted text with actions initiated by the at least one computing device after displaying respective text on the display, and generating an overlay on the display including a suggested action to perform based upon text subsequently displayed on the display and the concept map.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
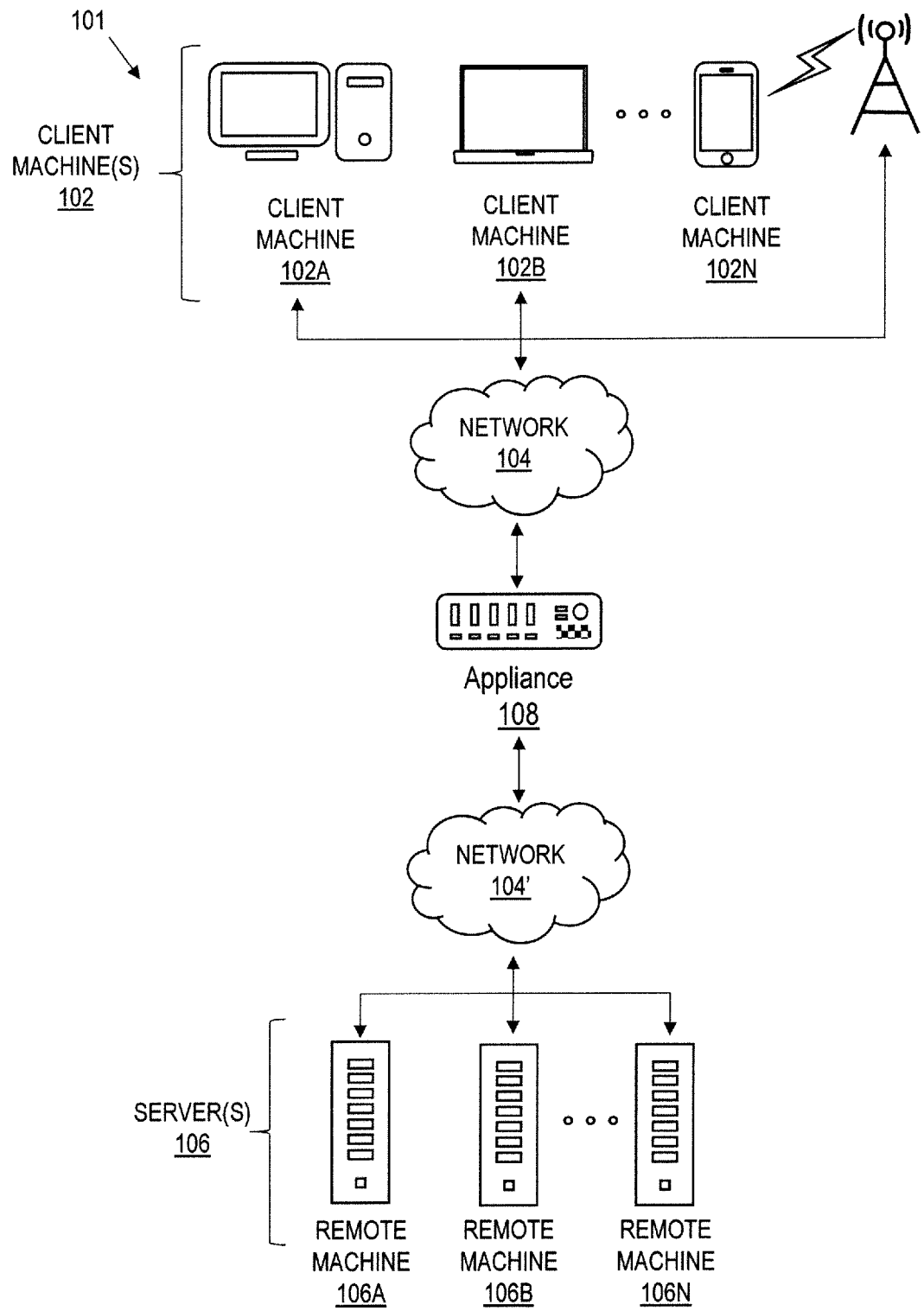
FIG. 1 is a schematic block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
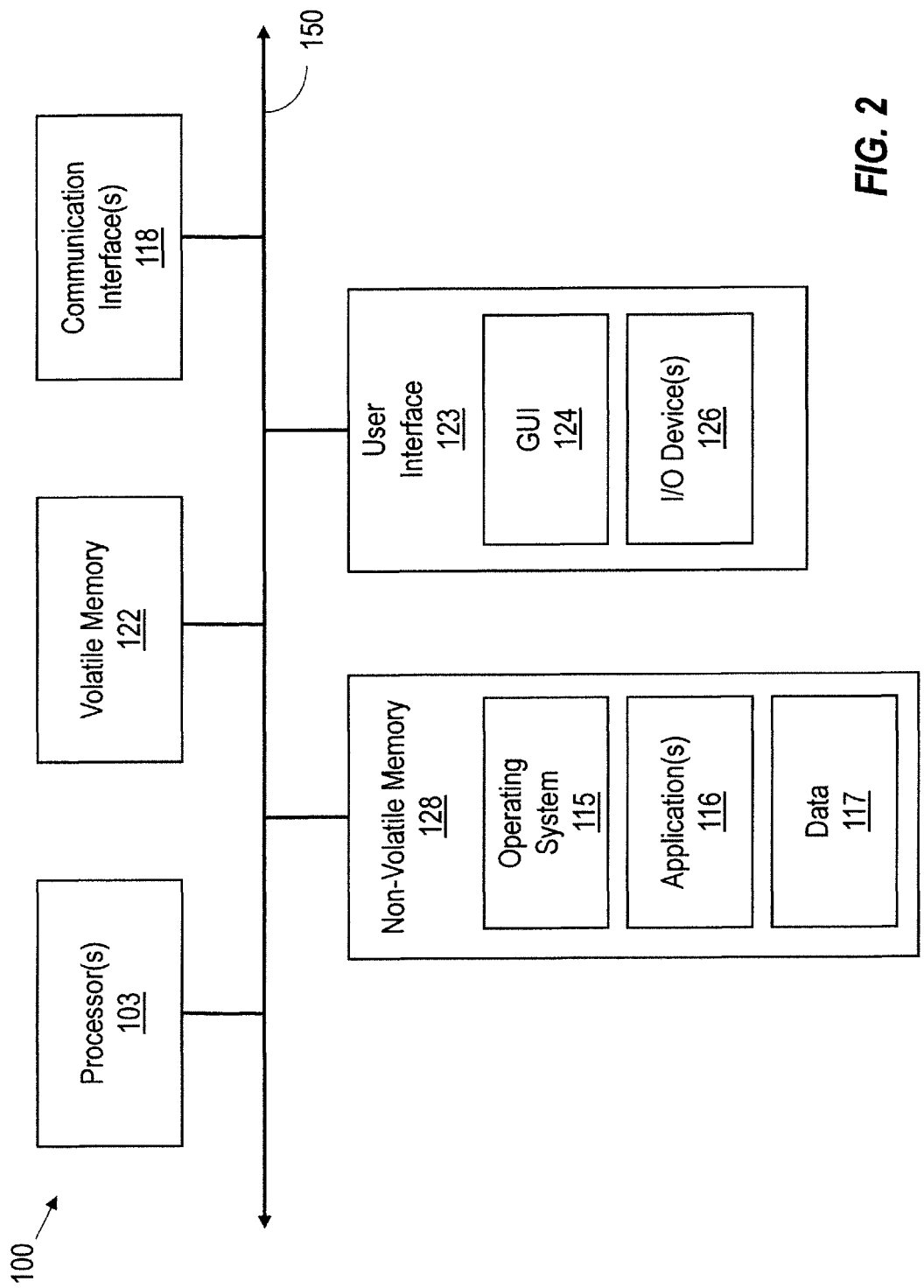
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
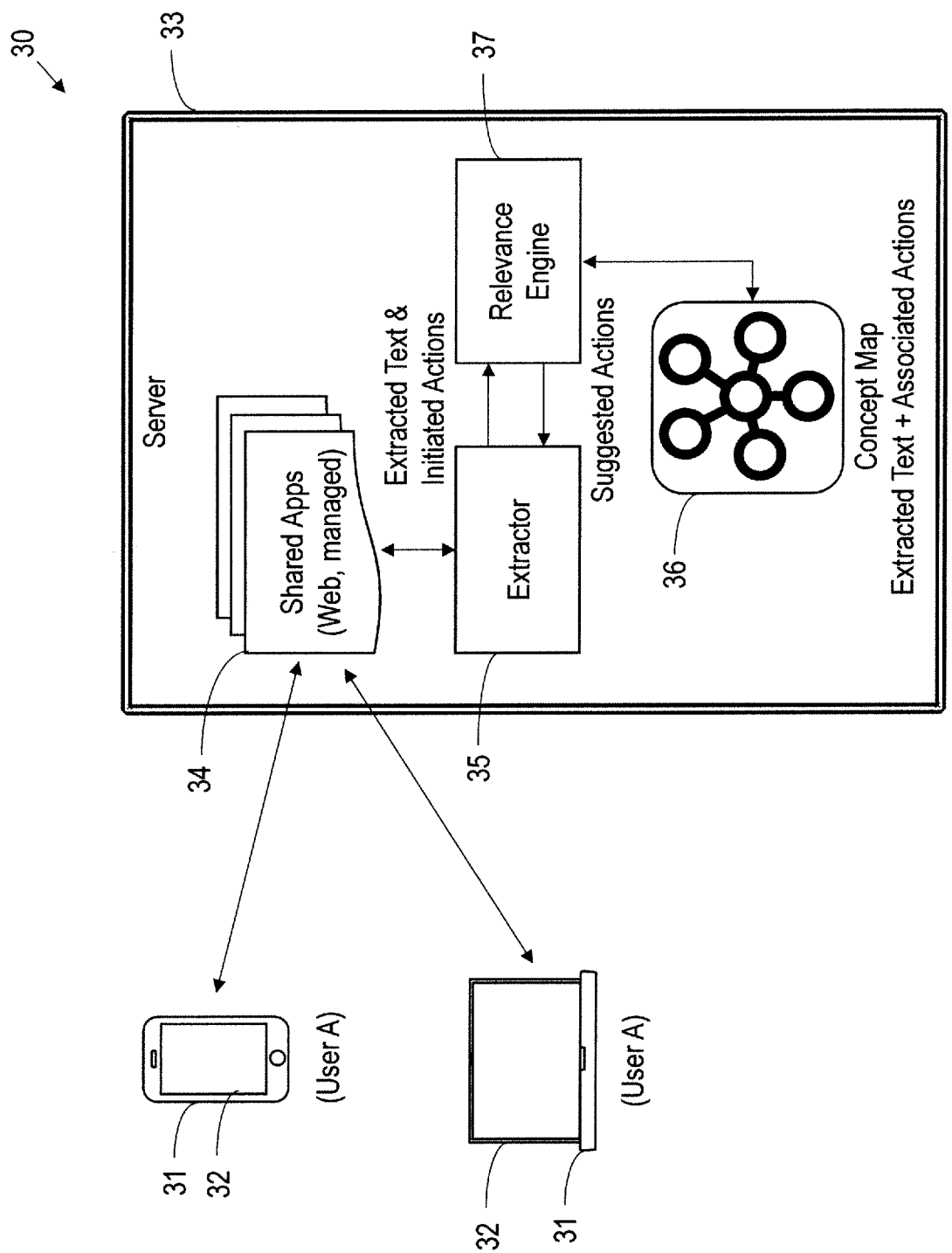
FIG. 3 is a schematic block diagram of a computer system providing recommended actions based upon text extracted across a plurality of shared applications by one or more client devices associated with a given user account.
Figure 4:
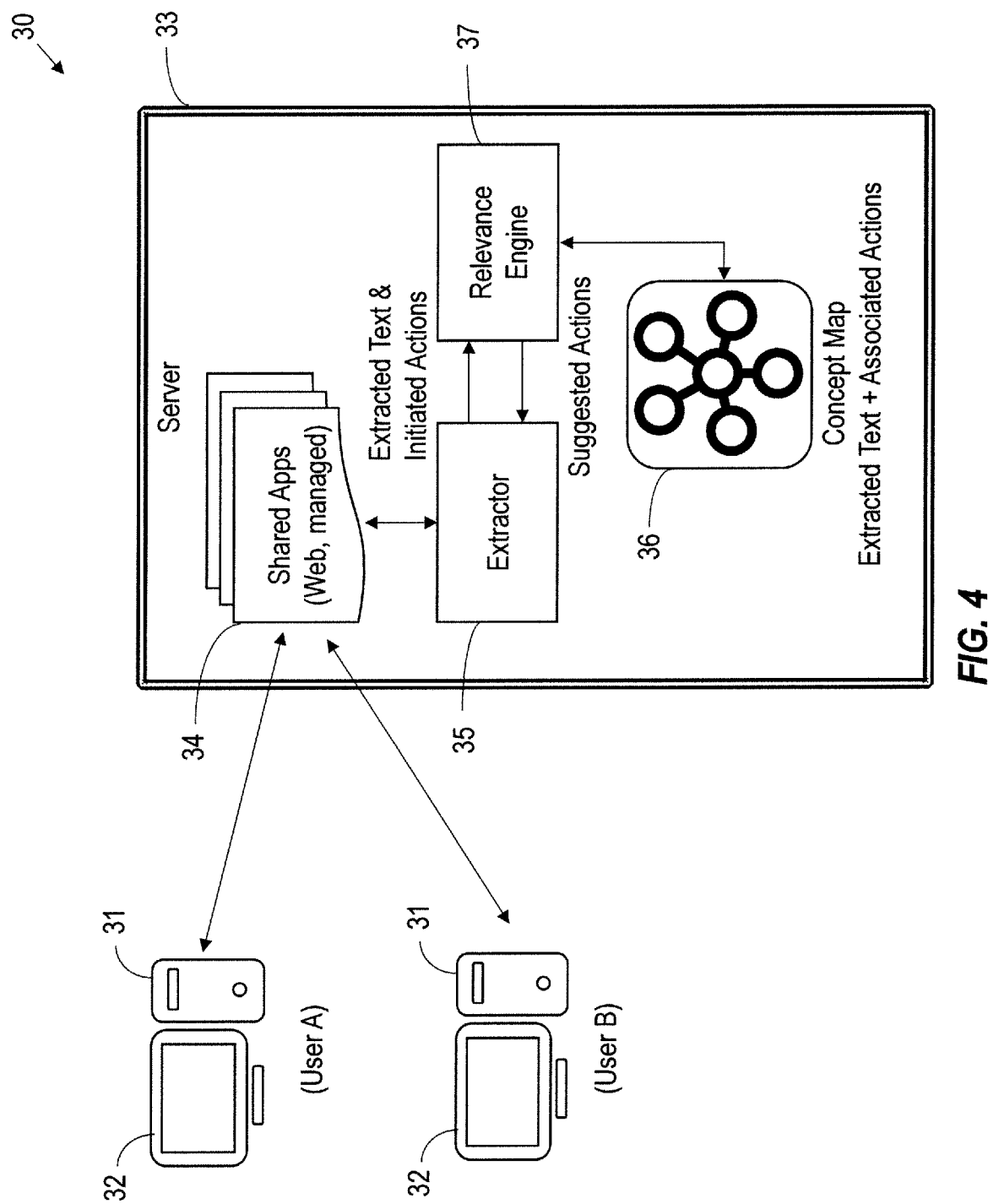
FIG. 4 is a schematic block diagram of the computer system of FIG. 3 providing recommended actions based upon text extracted across a plurality of shared applications by client devices associated with different users.
Figure 8:
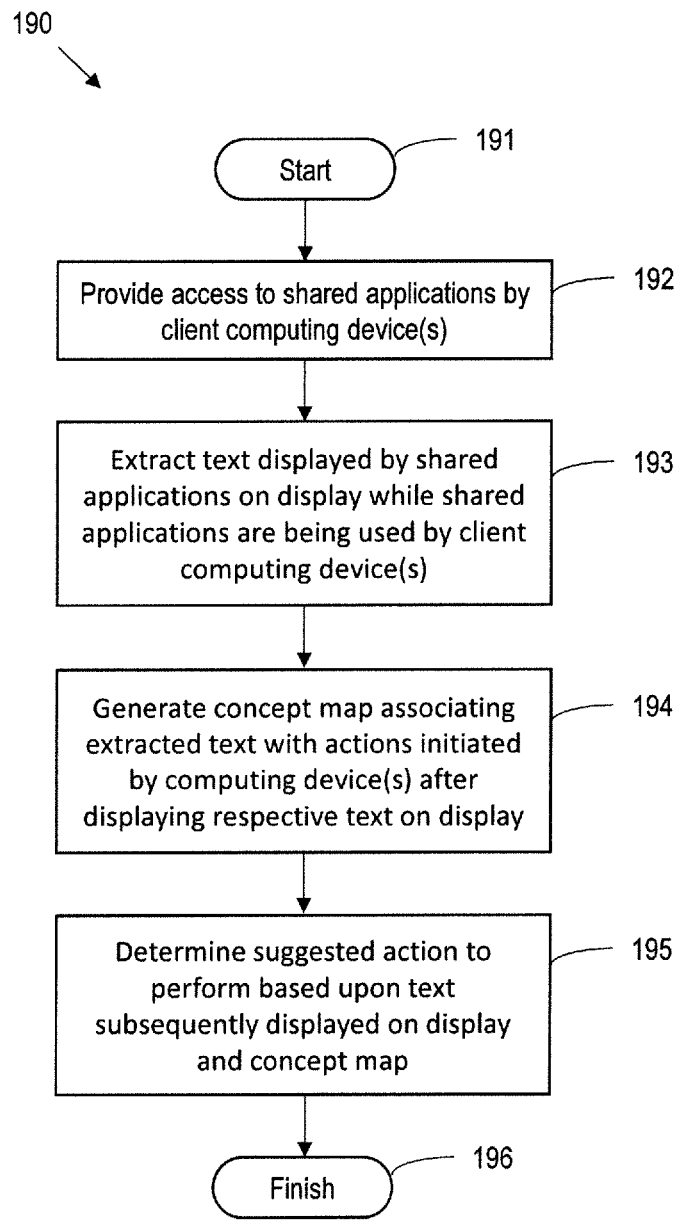
FIGS. 8 and 9 are flow diagrams illustrating method aspects associated with the system of FIG. 3.

Turning now to FIGS. 3-4 and the flow diagram 190 of FIG. 8, a computing system 30 and associated method aspects are first described. By way of background, computer users are being faced with more and more information every day, and the task of sorting and prioritizing what is important continues to become more difficult. For example, a user may receive many emails, some including attached reports. Users may also be exposed to numerous other media sources, such as internal/external web pages, yet they typically want to find and focus on just the information that is relevant to them or their job. Without suitable ways to efficiently "triage" such information, user productivity may be greatly reduced—both in the time spent trying to triage the information, but also in terms of valuable information which may be missed in the process. Yet, computer users often take the same repetitive action in similar contexts upon receiving information that is important to them. Some of these repetitive actions are fully automatable, and others may be assisted by automation.

Generally speaking, the system 30 provides a cross-platform, cross-application approach for automated learning of important information that is presented to a user, as well as the repetitive actions performed by the user in response to that information, so that these actions may be automated for the user going forward. The system 30 illustratively includes one or more client computing devices 31 such as those described above (e.g., smartphones, tablet computers, laptop/desktop computers, etc.) and associated display(s) 32. The displays 32 may be integrated with the client computing device 31 (such as in the case of a smartphone or tablet computer, for example), or may be separate from the client computing device (such as a computer monitor, for example).

The system 30 further illustratively includes one or more servers, which again may be similar to those described above with respect to FIGS. 1-2, and in some embodiments may be implemented in a cloud computing configuration. Beginning at Block 191, the server 30 is configured to provide the client computing devices 31 with access to a plurality of shared applications 34, at Block 192. As will be discussed further below, the shared applications may be native applications published by the server 30, Web application accessed through a shared browser, Software as a Service (SaaS) applications, etc. In accordance with one example implementation, Virtual Delivery Agents (VDAs) such as Citrix XenApp or XenDesktop may be used at the server 31 to provide access to shared applications and/or desktops, in cooperation with Citrix Receiver running on the client computing devices 31. However, other suitable programs and systems may also be used in different embodiments.

The server 33 is further configured to extract text displayed by the shared applications on the display 32 while the shared applications 34 are being used by the client computing device 31, at Block 192. In this regard, the server 33 illustratively includes an extractor module or engine 35 which cooperates with the shared applications and/or client devices 31 to perform the text extraction, as will be discussed further below.

Additionally, the server 33 also illustratively includes a relevance engine 37 which cooperates with the extractor 35 to generate a concept map 36 associating the extracted text with actions initiated by the client computing devices 31 after displaying respective text on the displays 32, at Block 194. The relevance engine 37 is also configured to determine a suggested action to perform for the user of the given client computing device 31 based upon text subsequently displayed on its display 32 and the concept map 36, at Block 195, which illustratively concludes the method of FIG. 8 (Block 196).

Generally speaking, a concept map defines suggested relationships between various concepts, which may be connected in a hierarchical structure. An example implementation of the concept map 36 is visually represented in FIG. 7, in which various concepts or key words are linked to User B through linking phrases, which in this implementation corresponds to various actions. Using the pertinent link phrases, the concept map 36 may be implemented in a relational database model. More particularly, in the relational database model, concepts in the map are defined as entity types or attributes according to the link phrases used. Linking phrases are also used to determine the type of relationship that exists between entity types. The concept map 36 may accordingly be implemented as a relational database model using a database engine such as SQL server, etc., for example.

The extractor 35, either on its own or in cooperation with the client-side agent (e.g., Citrix Receiver) is able to capture all the text that a user reads and writes during a computer session on the client computing device 31. Using this this text, natural language processing (NLP) techniques may be used to identify and map key concepts (e.g., project names, companies or people) in the concept map 36 along with actions taken in response to this key terminology. By iteratively expanding the concept map 36 for a particular user (or group of users), the relevance engine 37 may, over time, develop a weighting scheme between these concepts (e.g., by assigning (and updating) weights to the concepts within the relational database model). That is, the concept map 36 represents how significant various concepts are to a particular user or employee with respect to different actions that person performs.

While the server 33 may perform text extraction and recommend appropriate actions for a user based solely upon a single user device 31 using the shared applications 34, in the example illustrated in FIG. 3 the server also learns important text and corresponding actions for the user across different client devices. For example, the client computing devices 31 may use iOS, Android, Windows, or other operating systems, yet the server 33 may continue to build and refine the concept map 36 irrespective of which client computing device is accessing the shared applications 34. As such, the server 33 may advantageously build a concept map for a give user account (here User A) incorporating his or her specific preferences and actions.

In accordance with the example implementation illustrated in FIG. 4, the client devices 31 are associated with different respective user accounts (i.e., for User A and User B). That is, here the server 33 may advantageously learn actions associated with respective displayed text across a larger user base sharing the applications 34. For example, this may be appropriate for users in a call or help center, where many different users field messages and perform the same tasks responsive to such messages. In this scenario, a relatively large group of users may take repetitive actions in similar contexts. As such, the relevance engine 37 may be used not just to increase efficiency of a single user, but also to "train" new staff, as the concept map 37 has already been trained by other users to suggest the appropriate actions for specific key words. In some embodiments, the server 33 may perform both functions, that is, learning appropriate actions to automate or recommend for a user based upon the user's own activities and actions, as well as the activities and actions of other users performing the same or similar tasks. Moreover, this may be done across different platforms, such as for client devices operating on different respective networks.

Figure 5:
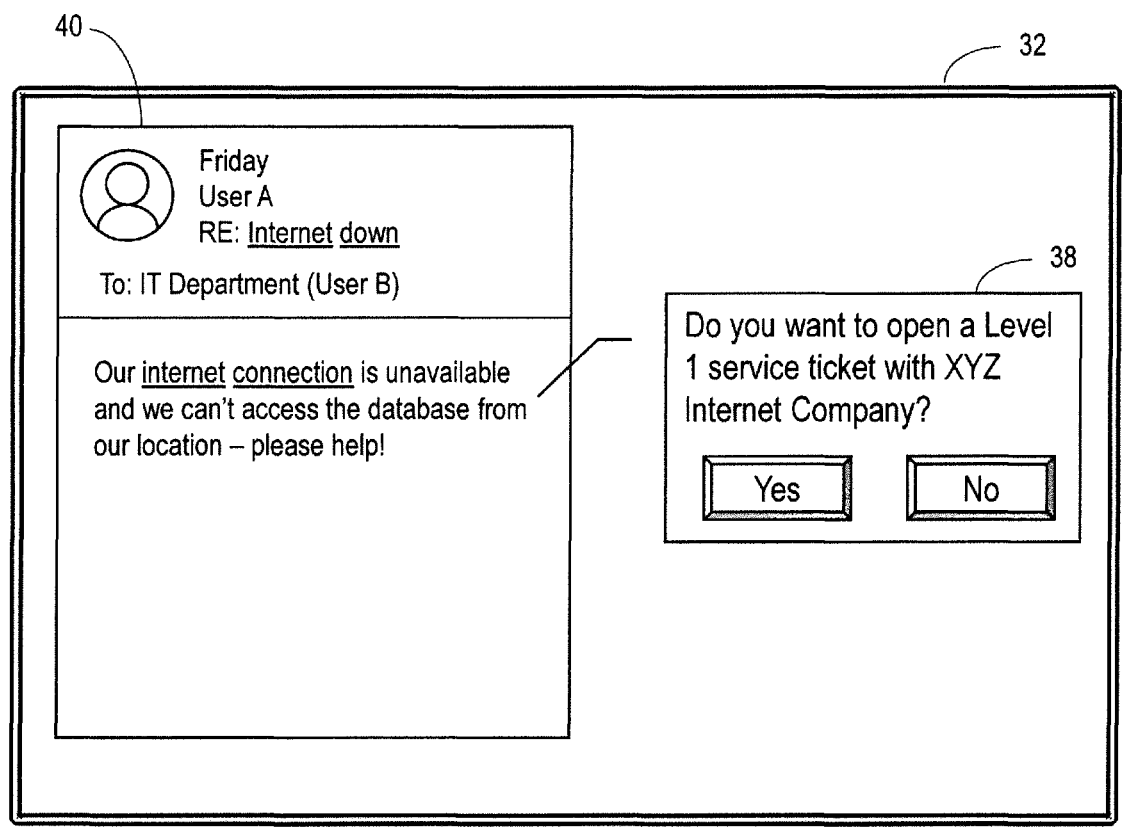
FIG. 5 is a view of a client device display of the system of FIG. 3 with an overlay providing a suggested action in accordance with an example implementation.
Figure 6:
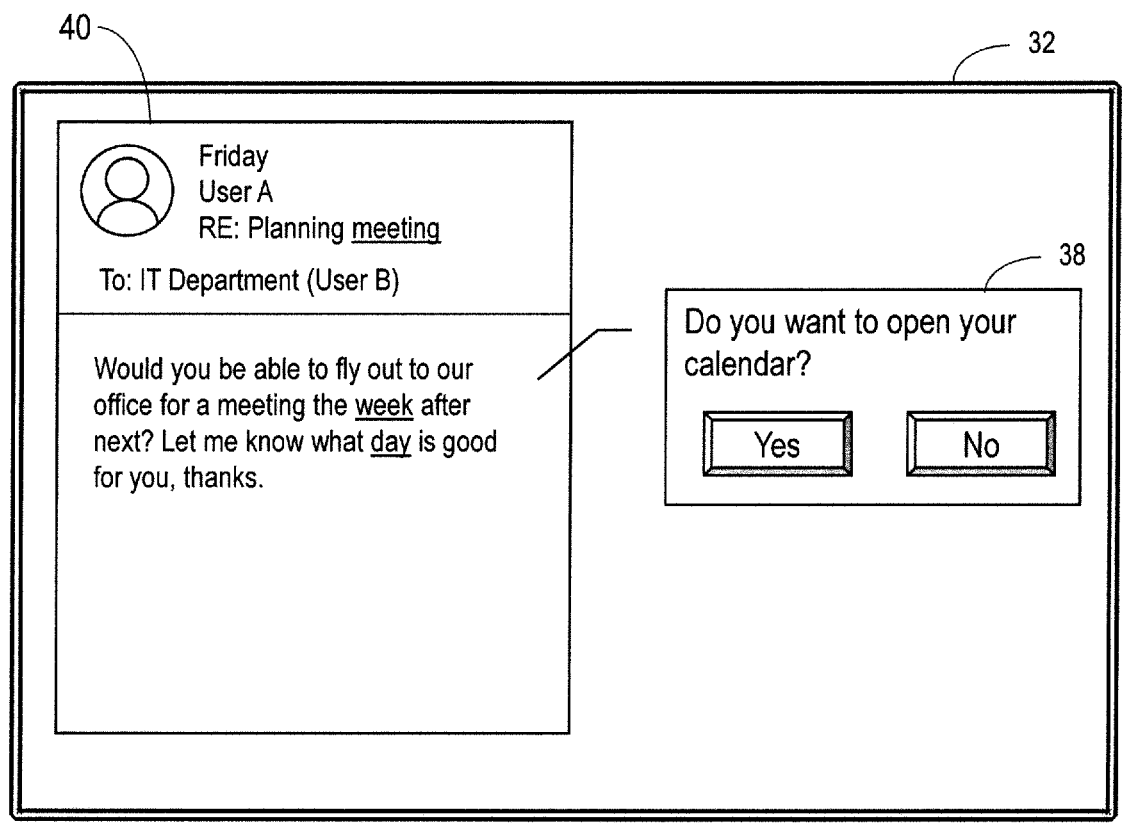
FIG. 6 is a view of a client device display of the system of FIG. 3 with an overlay providing a suggested action in accordance with another example implementation.

Referring additionally to FIGS. 5-6 and 10, once the concept map 36 is established (and optionally trained for a number of cycles and/or a period of time), this understanding may be used to interpret new information that a user comes into contact with. When a user is presented with new information (e.g. an email or a website) on the display 32, the server 33 may highlight important sections of text (or pointers to information if not directly on the screen) that are believed to be important to the user.

Figure 7:
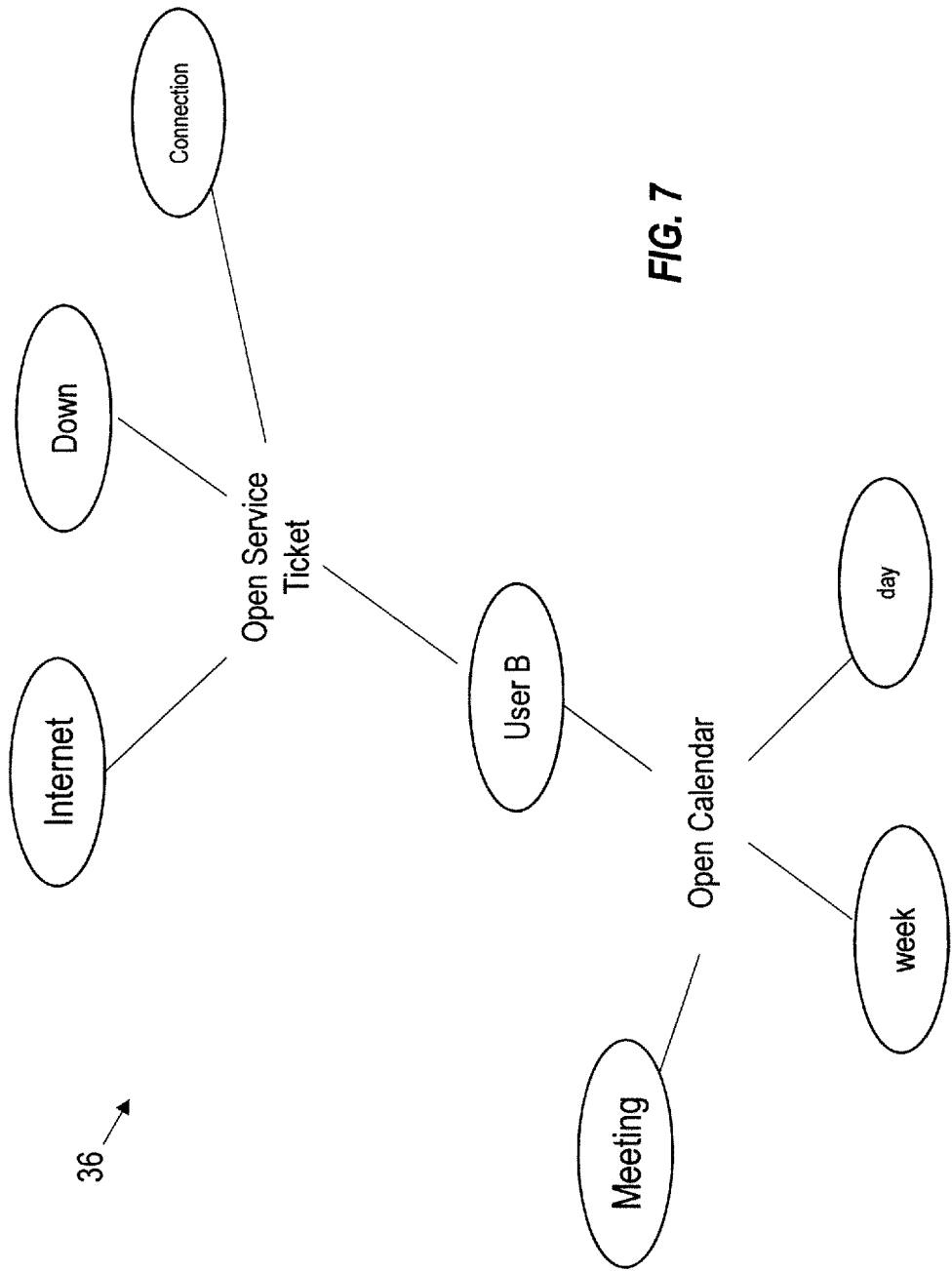
FIG. 7 is a diagram of a concept map associated with the examples of FIGS. 5 and 6.

In the example illustrated in FIG. 5, a shared email application is being used by User B (a member of an IT department), by which this user receives a message 40 from User A. The message is regarding an Internet outage User A would like help with, which includes keywords "Internet", "down", and "connection" which in the past have been found (in past emails, text messages, chats, etc.) to precede User B performing an action of generating a Level 1 service ticket to the XYZ Internet Company. These words are highlighted in the message 40 by underlining (although other forms of highlighting, or no highlighting at all, may be used in different embodiments). As a result, these three terms have been linked in concept map 36 to User B by the action of generating a service ticket (FIG. 7).

Figure 9:
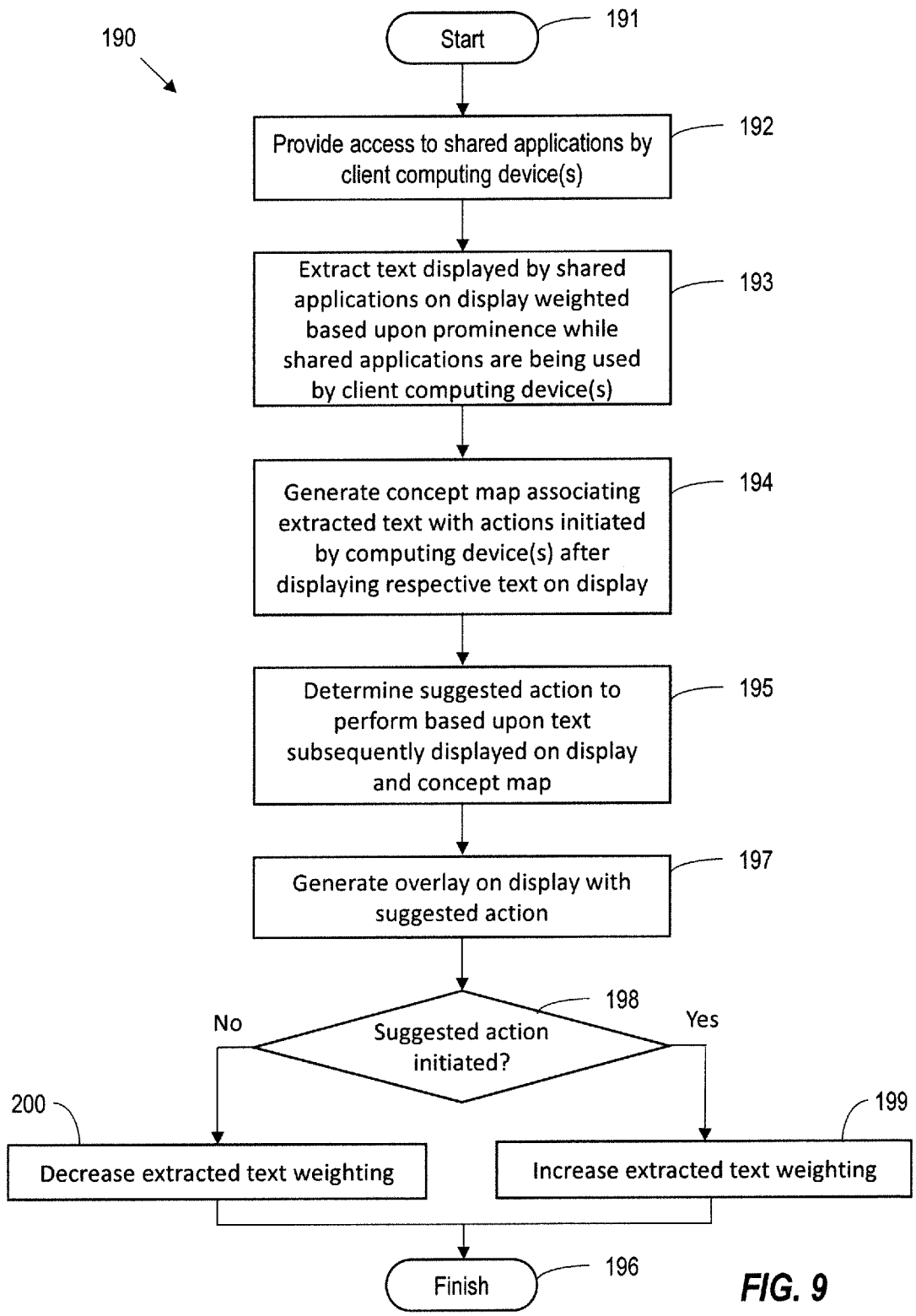

Moreover, based upon the prominence, frequency, etc., with which the various terms have been used, a relative weighting of their importance may be assigned to them (Block 193 of FIG. 9). In the illustrated example, both "Internet" and "down" are listed in the subject line of the email, and "Internet" and "connection" are both displayed in the body of the email. In this regard, "Internet" is the most prominent term, both in terms of being in the subject line, but also being repeated twice within the message 40, and "down" would be the second most prominent as it is in the subject line. In the concept map 36, this weighting is visually represented by different text sizes (larger size=higher weighting), though it will be appreciated that in a relational database this may be done via a mathematical weight or multiplier associated with each term.

In the present case, the relevance engine, upon being presented with the above-extracted terms, will determine from the content map 36 that the appropriate action to suggest is opening a Level 1 service ticket, and further causes an overlay 38 to be presented on the display 32 asking User B if this suggested action should be performed, at Blocks 197-198. If the answer is yes, then the relevance engine 37 may optionally increase the weighting associated with the above-noted terms, at Block 199. If this suggested action is declined, the relevance engine 37 may optionally decrease their weight (Block 200).

In the example shown in FIG. 6, User B receives a message 40 asking for his or her availability for a planning meeting week after next. As seen in the concept map 36 for User B, prior occurrences of the terms "meeting", "week", and "day" have resulted in the user opening a calendar application. Thus, the relevance engine makes this association from the concept map 36 and provides the overlay 38 asking if User B wants the calendar application opened. It should be noted that in some embodiments, actions may be automated without an overlay 38 or notice being provided to the user. For example, the user may be presented with the option on the first occurrence, along with the option to always perform this function responsive to the occurrence of these terms. In another example, once a particular weighting or confidence score is reached, or the suggested action has been accepted a certain number of times, the suggested action may be performed automatically without first asking the user.

Highlighting of key terms and/or the overlay 38 may be achieved as an overlay to a desktop and/or application implemented on top of the live content. In the above-noted implementation utilizing Citrix Receiver, the relevance engine 37 may cooperate with Receiver to provide the appropriate highlighting/overlays. Highlighting important information may help users become more productive, and serve to avoid important information being overlooked. In some implementations, highlighting or overlaying of text or suggesting actions may be performed based on statistical or Machine Learning (ML) algorithms. These may also be used to take user feedback into account, e.g., to perform weighting based upon whether the user made use of the suggested actions, etc.

Further example implementation details of the extractor 35 and relevance engine 37 will now be discussed. In an example embodiment, the extractor 35 may be implemented using software running on the VDA (e.g., XenApp, XenDesktop, etc.) which extracts text that is currently displayed on a user's screen or display 31. The extractor 35 may parse the text and submit it to a Natural Language Processing (NLP) and/or Concept Mining algorithm. NLP may be used to find keywords/topics in text that have been through optical character recognition (OCR). Example NLP implementations which may be used include TF-IDF, TextRank and RAKE, for example. Concept Map Mining serves to find and group conceptually related keywords. One example implementation may leverage a pre-existing or dynamically created thesaurus for this purpose.

The extractor 35 outputs a set of concepts with various weights. These are then submitted to the relevance engine 37 with the corresponding action associated therewith. For example, the action may include a link to the application/document/URL to be accessed. The extractor may be implemented differently for different applications. For example, with respect to Web apps, the extractor 35 may be implemented as a browser plugin which has direct access to all of the content on the page. For other types of applications (e.g., native applications), the extractor 35 may plug into the client access management program (e.g., Citrix Receiver) to snapshot a frame, identify blocks of text (e.g., paragraphs), run those regions through OCR to extract a body of text, and run the NLP algorithm over that text, submitting the concepts with various weights to the relevance engine 37. The extractor 35 (or other component of the VDA) may also extract one or more actions a user takes (mouse or keyboard input, application starts, file/URL opened, etc.)

In an example embodiment, the relevance engine 37 may receive a set of concepts from the extractor 35 with relevant weights associated with a particular document/URL (or other actions). The relevance engine 37 adds information to the unique concept map 36, increasing weights of existing nodes, and links between related concepts, as discussed above. Using the submitted concepts along with the user's concept map 36, the relevance engine 37 may establish: (a) whether any of the submitted concepts are highly correlated; (b) whether any documents/URLs are highly correlated; and (c) whether any actions are highly correlated. The relevance engine 37 may then return structured data to the caller, which includes concepts that are believed to be highly relevant, along with one or more suggested actions (e.g., related documents/URLs to be accessed).

With respect to generating highlighting or the overlay 38, various approaches may be used depending upon the type of application. For example, for Web and/or SaaS apps, the same browser plugin which extracted text from the page may receive back from the relevance engine 37 the concepts, links and actions believed to be relevant. The plugin can modify the page to add additional highlighting to regions of text related to those returned concepts. The plugin may also modify the page to add additional on-screen links to the related documents/URLs returned from the relevance engine. The plugin may also generate the overlay 38, and if triggered by the user, initiate the suggested action(s).

For native applications, the extractor 35 that submitted text to the relevance engine 37 for that region is returned a set of matched concepts along with related documents/URLs, etc. Using the example of Citrix Receiver, a plugin may use an overlay display driver to draw on top of the current screen over the region that was submitted if any matching concepts are returned. This plugin may also generate the overlay region 38 on screen which, if selected, will trigger a Receiver event (rather than on the application). This event would result in a command to launch a new application with a document/URL, or other action. The plugin overlays, and if triggered by the user, initiates the suggested action(s).

In accordance with an additional use case, the server 33 may further track behavior, responsive to which it may learn what operations are most likely to occur after particular information is found. For example, navigating customer forums (e.g., in a shared Web browser application), it may be very common that an employee wants to go and create a ticket in a customer relationship management (CRM) program such as Salesforce. The server 33 may accordingly provide an overlay 38 to create a ticket linking to that page and optionally pre-populating some of the fields. This may save the employee a significant amount of time.

In accordance with another example, the data sources used by the system 30 may be extended to include platform specific "digital assistants" that employees may already be using. Such an assistant may provide help either in accessing important information (e.g., calendar availabilities) or in offloading certain tasks queries.

Still another example use case for the system 30 is to implement an additional layer of security that is independent from a particular application or OS. For example, the relevance engine 37 may detect atypical behavior from an individual or group, and flag up a suspicious score for further investigation by an administrator. One scenario where this may be beneficial is if a third party got access to valid credentials of another user.

In addition to extracting information from texts via OCR, the server 33 may also process images and icons in a similar way. This may be of interest where graphical user interfaces allow users to trigger frequently used actions using icons. An alternative implementation of the extractor 35 and overlay 38 may be supported by additional software running on the server 33 that actually provides the OS or application with which a user interacts. This may be beneficial in that local Application Programming Interfaces (APIs) may be used to either extract additional information, or to perform relevant actions.

The above-described approach advantageously provides a single gateway to many or all of the actions a user performs (e.g., an employee as part of his or her job) across different applications, and is able to determine what is relevant for the user and interact with the user's applications accordingly. Moreover, through the use of the concept map 36, the present approach is able to determine relative importance, and to accurately identify inter-dependent concepts.

By collecting and interpreting text that an employee is reading/engaging with inside a shared application session, the system 30 may advantageously build a constantly improving/evolving understanding of topics that are relevant to a user, and actions the user subsequently takes. The system 30 accordingly may provide assistive markers (e.g., "call outs" or "quick actions") that either draw attention to information that is particularly relevant, or actions that are likely to be taken, as noted above.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing system comprising:
at least one client computing device and a display associated therewith; and
a server configured to
provide access to a plurality of shared applications by the at least one client computing device,
extract text displayed by the shared applications on the display while the shared applications are being used by the at least one client computing device,
generate a concept map associating the extracted text with actions initiated by the at least one client computing device after displaying respective text on the display,
weight the extracted text within the concept map,
determine a suggested action to perform based upon text subsequently displayed on the display and the concept map and generate an overlay to be displayed on the display including the suggested action, and
increase a weighting associated with the extracted text in the concept map based upon initiation of the suggested action by the at least one client computing device responsive to the overlay.

2. The system of claim 1 wherein the at least one client computing device comprises a plurality of client computing devices each with a respective display, and wherein the server is configured to extract text displayed by the shared applications across the plurality of client computing devices.

3. The system of claim 1 wherein the server is further configured to decrease the weighting associated with the extracted text in the concept map based upon declining of the suggested action by the at least one client computing device responsive to the overlay.

4. The system of claim 1 wherein at least one of the shared applications comprises a Web application, and wherein the server extracts text displayed by the Web application via a Web browser plugin.

5. The system of claim 1 wherein the server is configured to perform optical character recognition (OCR) to extract text displayed by at least one of the shared applications on the display.

6. The system of claim 1 wherein at least one of the actions comprises opening a service ticket.

7. The system of claim 1 wherein at least one of the actions comprises opening a calendar application.

8. A method comprising:
using a server to provide access to a plurality of shared applications by at least one client computing device having a display associated therewith;
extracting text displayed by the shared applications on the display while the shared applications are being used by the at least one client computing device;
generating a concept map at the server associating the extracted text with actions initiated by the at least one client computing device after displaying respective text on the display;
weighting the extracted text within the concept map;
determining a suggested action to perform based upon text subsequently displayed on the display and the concept map and generating an overlay to be displayed on the display including the suggested action; and
increasing a weighting associated with the extracted text in the concept map based upon initiation of the suggested action by the at least one client computing device responsive to the overlay.

9. The method of claim 8 wherein the at least one client computing device comprises a plurality of client computing devices each with a respective display, and wherein extracting comprises extracting text displayed on the displays by the shared applications across the plurality of client computing devices.

10. The method of claim 8 further comprising decreasing the weighting associated with the extracted text in the concept map based upon declining of the suggested action by the at least one client computing device responsive to the overlay.

11. The method of claim 8 wherein at least one of the shared applications comprises a Web application, and wherein extracting comprises extracting text displayed by the Web application via a Web browser plugin.

12. The method of claim 8 wherein extracting text further comprising performing optical character recognition (OCR) to extract text displayed by at least one of the shared applications on the display.

13. The method of claim 8 wherein the action comprises at least one of opening a service ticket and opening a calendar application.

14. A non-transitory computer-readable medium having computer-executable instructions for causing a virtualization server to perform steps comprising:
providing access to a plurality of shared applications by at least one client computing device having a display associated therewith;
extracting text displayed by the shared applications on the display while the shared applications are being used by the at least one client computing device;
generating a concept map associating the extracted text with actions initiated by the at least one client computing device after displaying respective text on the display;
weighting the extracted text within the concept map;
determining a suggested action to perform based upon text subsequently displayed on the display and the concept map and generating an overlay to be displayed on the display including the suggested action; and
increasing a weighting associated with the extracted text in the concept map based upon initiation of the suggested action by the at least one client computing device responsive to the overlay.

15. The non-transitory computer-readable medium of claim 14 wherein the at least one client computing device comprises a plurality of client computing devices each with a respective display, and wherein extracting comprises extracting text displayed on the displays by the shared applications across the plurality of client computing devices.

16. The non-transitory computer-readable medium of claim 14 further having computer-executable instructions for causing the server to decrease the weighting associated with the extracted text in the concept map based upon declining of the suggested action by the at least one client computing device responsive to the overlay.

* * * * *